Patented Nov. 7, 1950

2,529,333

UNITED STATES PATENT OFFICE 2,529,333

BORON CARBIDE ARTICLE AND METHOD OF MAKING

Gordon R. Finlay, Chippawa, Ontario, Canada, assignor to Norton Company, Worcester, Mass., a corporation of Massachusetts No Drawing. Application November 18, 1948, Serial No. 60,830

3 Claims. (Cl. 106—43)

The invention relates to bodies molded from boron carbide and a composition for the molding of such bodies.

One object of the invention is to make a superior venturi nozzle for jet propulsion and gas turbines. Another object is to provide a composition with which to make molded bodies which have nearly the resistance to abrasion of molded boron carbide but have superior qualities in resistance to thermal shock. Another object is to provide a composition and an article of the class indicated having high compressive strength. Another object of the invention is to provide a superior composition for the manufacture of turbine blades, for gas turbines, aerial or otherwise.

Other objects will be in part obvious or in part pointed out hereinafter.

The invention accordingly consists in the combinations of elements all as will be illustratively described herein and the scope of the application of which will be indicated in the following claims.

I provide a quantity of boron carbide molding powder, commercial grade, made according to U. S. Letters Patent No. 1,897,214 to Raymond R. Ridgway. These molding powders may have a variable B/C ratio, from about 5.30 down to about 3.80, where 4.00 represents the pure compound boron carbide, $B_4C$. Such commercial boron carbide powders have now for some time been used as molding powders for the manufacture of all kinds of articles which have high wear resistance and are harder than any substance previously known except the diamond. Jet nozzles of molded boron carbide have been made but have been found to be deficient in thermal shock characteristics. I have discovered that if I add from 5% to 25% by volume of commercial silicon powder (98% purity and higher) to the commercial boron carbide molding powder, a superior jet nozzle, above referred to as a venturi nozzle, results, having quite superior resistance to thermal shock. Molding may be carried out as fully described in U. S. Letters Patent to Raymond R. Ridgway, No. 2,125,588, and hence need not be in detail described herein. Instead of using the resistor type of molding furnace of this Patent No. 2,125,588, an induction heating molding apparatus may be used. The molding is hot pressure molding and the temperature should rise to about 2150° C. using a pressure of about 2500 pounds per square inch (about all the graphite molds will stand). As indicated, graphite molds should be used. In this type of hot pressure molding the plungers suddenly move when the material has reached the critical molding temperature, so the operator can be guided by this phenomenon instead of relying on estimates of the temperature.

It is surprising that the silicon, which has a melting point of about 1420° C., does not melt and run out long before the molding temperature of about 2150° C. is reached, but it does not. There is no visual evidence of the silicon in the molded piece which looks and feels just like a piece of molded boron carbide.

The top molding temperature should be about as indicated, but there is still some uncertainty in temperature determination at this level so I can say at least 2000° C. The pressure may be anything from 500 pounds up, the top limit being whatever the molds and apparatus will stand. The higher the pressure, the denser the article, so 2500 pounds to the square inch commercially about the highest without encountering serious mold breakage, is preferred.

The following table gives the compressive strength of articles made according to the invention:

*Table*

| Composition by Volume | | B/C Ratio of Boron Carbide | Strength in Compression, p. s. i. |
|---|---|---|---|
| Boron Carbide | Silicon | | |
| 80 | 20 | 5.26 | 405,000 |
| 80 | 20 | 3.85 | 313,000 |
| 85 | 15 | 5.26 | 413,000 |
| 85 | 15 | 4.00 | 317,000 |
| 85 | 15 | 3.85 | 334,000 |

Impurities of all kinds do not run over 2%.

The strength of boron carbide in compression runs from about 400,000 pounds per square inch for the best pieces down to 200,000 pounds per square inch for inferior pieces, the average being around 275,000 pounds per square inch. If the molding pressures are the same, the average piece according to the present invention will be stronger than a corresponding piece of molded boron carbide without the silicon.

A more important feature of the article and composition of the invention, especially for uses such as venturi nozzles and turbine blades, is the resistance to heat shock. Boron carbide will crack from thermal shock if plunged into icy water from a temperature of 900° C., whereas articles made according to the invention do not crack under these same circumstances. The above facts were found by testing molded pieces in the shape of solid cylinders ⅜ inch in diameter and ⅜ inch long.

This resistance to thermal shock is very important for venturi nozzles for jet propulsion. Nozzles made according to the invention ought to stand up for a relatively long time without showing any signs of spalling. Turbine blades made of the material of this invention are more refractory than blades made from any of the usual metals and may be expected to withstand the required conditions of alternate heating and cooling.

Furthermore, the material of this invention is easier to mold than straight boron carbide and consequently there are fewer pieces that have to be rejected. Ease of molding is very important in pieces of irregular shape such as turbine blades.

It will thus be seen that there has been provided by this invention an article and a composition of matter in which the various objects of the invention and many practical advantages are successfully achieved. As many possible embodiments may be made of the invention and as many changes might be made in the embodiments above set forth, it is to be understood that all matter set forth herein is to be taken as illustrative and not in a limiting sense.

I claim:

1. A molded article which has been heated to at least 2000° C. and pressed at at least five hundred pounds to the square inch consisting of at least 98% a homogeneous phase of boron carbide having a B/C ratio of from 3.80 to 5.30, from 73% to 93% by volume, the remainder, except for up to 2% impurities, silicon, of said 2% impurities not more than a trace having any nitrogen.

2. A composition which has been heated to at least 2000° C. and pressed at at least five hundred pounds to the square inch consisting of at least 98% a homogeneous phase of boron carbide having a B/C ratio of from 3.80 to 5.30, from 73% to 93% by volume, the remainder, except for up to 2% impurities, silicon, of said 2% impurities not more than a trace having any nitrogen.

3. Process of making hard refractory articles which comprises filling a graphite mold with a mixture of boron carbide having a B/C ratio of from 3.80 to 5.30 and elemental silicon, the boron carbide being from 73% to 93% by volume of the total mixture, the remainder of the mixture except for up to 2% impurities being silicon, heating said mixture in said mold to a temperature of at least 2000° C. under a pressure at the top temperature of at least 500 pounds per square inch and in a reducing atmosphere on account of the graphite which atmosphere contains insufficient nitrogen to be a nitriding atmosphere.

GORDON R. FINLAY.

REFERENCES CITED

The following references are of record in the file of this patent:

FOREIGN PATENTS

| Number | Country | Date |
|--------|---------|------|
| 30,869 | Austria | 1907 |